United States Patent
Komulainen et al.

(10) Patent No.: US 10,819,033 B2
(45) Date of Patent: Oct. 27, 2020

(54) TRANSMITTING AND RECEIVING RADIO SIGNALS WITH TUNABLE ANTENNAS TUNED BASED ON THROUGHPUT PERFORMANCE

(71) Applicant: Apple Inc., Cupertino, CA (US)

(72) Inventors: Mikko S. Komulainen, Tampere (FI); Saku Lahti, Tampere (FI); Petri T. Mustonen, Tampere (FI)

(73) Assignee: Apple Inc., Cupertino, CA (US)

( * ) Notice: Subject to any disclaimer, the term of this patent is extended or adjusted under 35 U.S.C. 154(b) by 866 days.

(21) Appl. No.: 15/195,859

(22) Filed: Jun. 28, 2016

(65) Prior Publication Data

US 2017/0373398 A1 Dec. 28, 2017

(51) Int. Cl.
| | | |
|---|---|---|
| *H01Q 9/04* | (2006.01) |
| *H04W 72/04* | (2009.01) |
| *H01Q 1/24* | (2006.01) |
| *H04B 1/00* | (2006.01) |
| *H04L 12/26* | (2006.01) |
| *H04W 72/08* | (2009.01) |

(52) U.S. Cl.
CPC .......... *H01Q 9/0442* (2013.01); *H01Q 1/243* (2013.01); *H01Q 1/246* (2013.01); *H04B 1/00* (2013.01); *H04L 43/16* (2013.01); *H04W 72/042* (2013.01); *H04W 72/0413* (2013.01); *H04W 72/0453* (2013.01); *H04W 72/085* (2013.01)

(58) Field of Classification Search
CPC .......... H01Q 1/243; H01Q 1/246; H01Q 1/24; H01Q 9/04; H01Q 9/0442; H01Q 21/30; H04B 1/00; H04L 43/16; H04W 72/0413; H04W 72/042; H04W 72/0453; H04W 72/085

See application file for complete search history.

(56) References Cited

U.S. PATENT DOCUMENTS

| | | | | |
|---|---|---|---|---|
| 7,671,804 B2 * | 3/2010 | Zhang | ................... | H01Q 1/243 |
| | | | | 343/700 MS |
| 8,947,302 B2 * | 2/2015 | Caballero | .............. | H01Q 1/243 |
| | | | | 343/702 |
| 9,112,266 B2 * | 8/2015 | Shewan | ................... | H01Q 9/42 |
| 9,559,756 B2 * | 1/2017 | Desclos | ............... | H04B 7/0413 |
| 10,218,052 B2 * | 2/2019 | Pascolini | ............ | H01Q 9/0442 |
| 10,270,174 B2 * | 4/2019 | Paulotto | .................. | H01Q 1/38 |
| 2015/0282170 A1 | 10/2015 | Lahti et al. | | |
| 2017/0181133 A1 * | 6/2017 | Cesares Cano | ...... | H04B 17/336 |

FOREIGN PATENT DOCUMENTS

| | | |
|---|---|---|
| CN | 104954106 A | 9/2015 |
| DE | 102015101800 A1 | 10/2015 |
| TW | 201543853 A | 11/2015 |

* cited by examiner

*Primary Examiner* — Tho G Phan
(74) *Attorney, Agent, or Firm* — Kowert, Hood, Munyon, Rankin & Goetzel, P.C.

(57) ABSTRACT

An apparatus of a user equipment (UE) to perform tuning of a tunable antenna may comprise baseband circuitry and radio frequency (RF) circuitry. The baseband circuitry may determine an indication of throughput performance of a tunable antenna for the UE while the tunable antenna is in a first state. The RF circuitry may select a second state for the tunable antenna based on the indication of throughput performance for the tunable antenna. The second state may be selected to improve throughput performance of a data stream for the UE. The RF circuitry may also generate a control signal to transition the tunable antenna to the second state.

21 Claims, 5 Drawing Sheets

TRANSMITTING AND RECEIVING RADIO SIGNALS WITH TUNABLE ANTENNAS TUNED BASED ON THROUGHPUT PERFORMANCE

BACKGROUND

The disclosure relates to the field of wireless communications, including control and operation of tunable antennas by user equipment.

BRIEF DESCRIPTION OF THE DRAWINGS

Various implementations of the present disclosure will be understood more fully from the detailed description given below and from the accompanying drawings of various implementations of the disclosure.

DETAILED DESCRIPTION

User equipment (UE) may use one or more tunable antennas to transmit and receive signals from a network. A UE may include any device such as a hand-held telephone, a laptop computer, or other device that communicates with a network. In order to improve the efficiency of communications received and transmit by a tunable antenna, a control system may tune the antenna to a state that efficiently operates at a frequency used by the network for communications with the UE. However, some UEs using multiple antennas or using carrier aggregation may have multiple data streams at different frequencies. The efficiency of communication over these data streams may vary depending on the environment of a particular UE and may change rapidly based on movement and position of a UE. Therefore, in order to tune an antenna efficiently, the UE may monitor data throughput or other performance characteristics and adjust the antenna to optimize the received or transmitted data. For example, the UE may determine that one data stream of the signals sent to or from the network has a weaker signal or lower efficiency than other data streams. The weak signal may be detrimental to the overall data throughput. Thus, the UE may tune the antenna to a new state that has greater efficiency at the weak component of the signal.

Some electrically tunable antennas may be electrically tunable to various operation frequencies. A tunable antenna may not cover all frequency bands used by a wireless network with the same efficiency. Rather, the tunable antenna may provide dynamically selectable narrow frequency bands. When selected by the tunable antenna, a narrow frequency band may exhibit higher efficiency than is achievable with a similarly sized wide-band or multiband antenna. Thus, a smaller tunable antenna may be used in a UE with the same performance as a larger wide-band antenna.

Multiple input multiple output (MIMO) communication systems use multiple antennas on a transmission and receiving side. For example a UE in a MIMO environment may include multiple antennas to receive and transmit data from multiple antennas of a base station. A typical MIMO system may include two transmission antennas and two reception antennas, but other communication systems may use any number of antennas on the transmission and reception side of a communication channel. Using multiple antennas at the transmitter and receiver enables a signal to propagate through multiple signal paths to carry data. Due to the different position of multiple antennas, the different signal paths may produce signals at the receiving antennas that different characteristics. For example, some signal paths may experience greater attenuation, noise, or interference compared to others. In addition, each signal path may impact different frequencies in a different manner. For example, one signal may provide a clear signal at a first frequency, but that frequency may experience a high level of interference through a second signal path.

Selecting a state for a tunable antenna based on the carriers scheduled by the network may provide an initial estimate for tuning of the antenna. For example, if multiple streams are being transmit or received by a UE, the antenna may be tuned to a state such that a most efficient frequency of the antenna is set to a frequency of one or more of the carriers scheduled by the network. However, leaving the state of the tunable antenna to the selected state regardless of the throughput performance may not provide the optimal tuning during dynamic situations. As a UE moves, particularly in an environment with many objects causing interference, the throughput of various streams may be affected differently. For example, in an urban environment, the throughput or signal strength of some streams may be affected more than others by interference from multipath propagation of signals. Thus, in order to improve the selection of a state for a tunable antenna, the UE may dynamically update a state for the antenna based on measured data for the throughput of the UE.

The benefits of dynamically updating the state of the antenna may be particularly useful during utilization of carrier aggregation (CA) over the network connection. CA is used in networks to increase bandwidth and thereby increase data throughput. Using CA, a UE may use more than one carrier to communicate with a network. Depending on the configuration CA may be referred to as intra-band or inter-band CA. In intra-band CA, a UE uses multiple carriers within a single frequency band to provide additional bandwidth. For example, if a frequency band is 60 MHz and can have carriers with bandwidths of 5 MHz, 10 MHz, 15 MHz, or 20 MHz, a UE may use 30 MHz of bandwidth by aggregating a 10 MHz and 20 MHz carrier. In inter-band CA, the UE may aggregate carriers in a similar manner, but may use carriers from different frequency bands. Accordingly, because the frequencies of carriers in inter-band CA may be further apart than those used during intra-band CA, the performance difference from tuning the antenna may be significant.

When operating using CA, a UE may set the tunable antenna to a state based on the carriers being aggregated.

Without dynamically updating the state of a tunable antenna, the antenna will operate based on the predefined state regardless of the performance of various carriers in the environment. However, if certain carriers are propagating better or worse based on the environment, the initial state of the antenna may not be the optimally performing state. Accordingly, improved throughput performance may be achieved by tuning the antenna based on throughput performance of various carriers.

A UE may use a variety of parameters or indicators to determine how to tune an antenna for improved performance. Some parameters that may be used may include realized throughput (TP), a received signal strength indicator (RSSI), RSSI or TP of the weakest MIMO stream, RSSI of TP of weakest band and/or channel in CA use, power consumption of modem or modem sub-system, data provided by sensor or sensors of mobile radio device, smallest transmit power request by base station, smallest transmit power request by base station for the weakest performing MIMO stream, smallest transmit power request by base station for the weakest performing band or channel, data obtained from modem or device setting required in making the device compliant with regulation requirements (e.g. maximum allowed transmit power), or the like. The UE may use different parameters for uplink and downlink optimization. For example, the UE may use transmit power requests from a base station during uplink optimization and an RSSI for downlink optimization A UE may also experience different signal characteristics during reception of signals than during transmission of signals. For example, an antenna may receive a strong signal at a particular frequency, but transmission at that frequency may not be received well at a base station. Accordingly, optimizing a tunable antenna for transmission may result in a different state compared with optimizing a tunable antenna for reception. Thus, a UE may make a determination whether to optimize one or more tunable antennas for uplink or downlink performance. In some implementations, the UE may determine to optimize for downlink performance unless the transmit power requested by a base station is above a threshold value. When the transmit power request is over the threshold value, it may indicate that the transmission performance of the antenna is low. Therefore, the UE may tune one or more antennas to improve transmission performance to improve throughput or to conserve power. In some implementations, the UE may determine to optimize for uplink or downlink performance based on the expected load of uplink or downlink transmissions. For example, if the UE recognizes that there is a large upload or download scheduled then the UE may optimize the tuning of the antenna for that data. Thus, if there is a large amount of expected uplink data, the UE may optimize tuning for transmission of data. On the other hand, if there is a large amount of expected downlink data, the UE may optimize tuning for reception of data. In some implementations, the UE may optimize for uplink or downlink based on more than one factor. For example, the UE may optimize for uplink or downlink data based on transmit power request as discussed above until there is a large expected uplink or downlink load. Then, the UE may optimize for the expected load.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed disclosure. However, various aspects of the disclosed implementations may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

Figure 1:
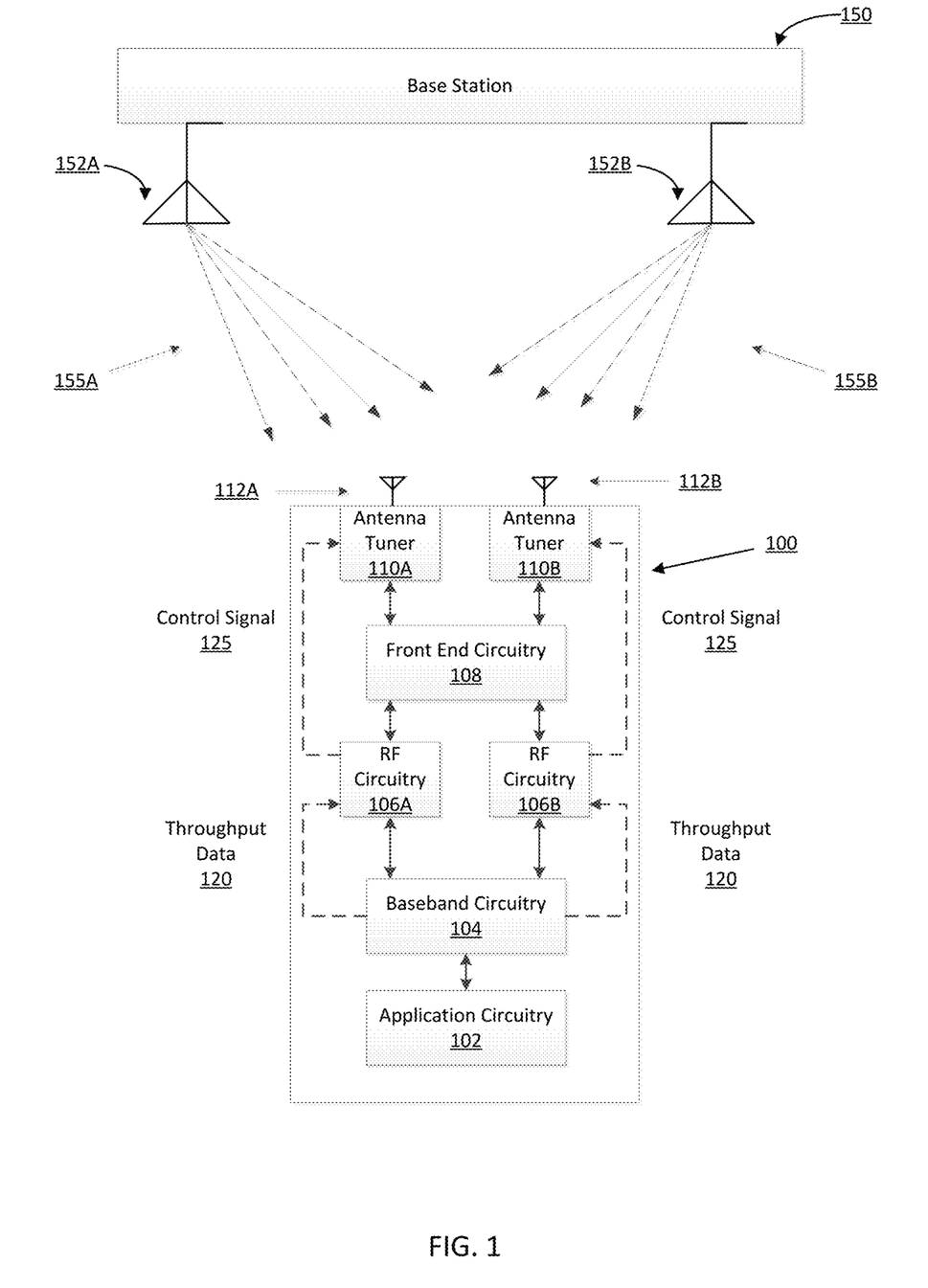
FIG. 1 is a block diagram illustrating components of an electronic device implementing aspects of the disclosure, according to an implementation.
Figure 3:
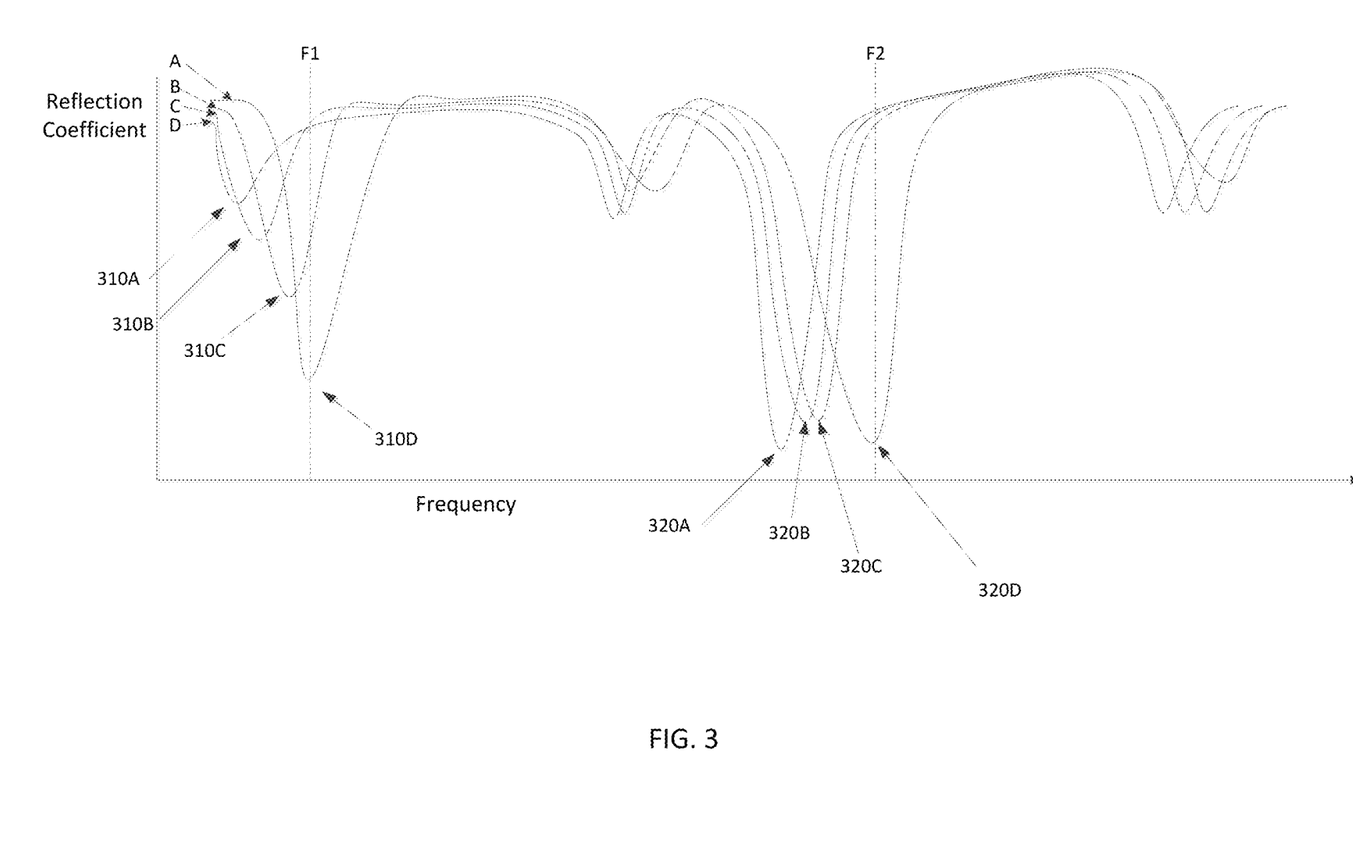
FIG. 3 is a graph illustrating characteristics of an antenna, according to an implementation.

Implementations described herein may be implemented into a system using any suitably configured hardware and/or software. FIG. 1 illustrates, for one implementation, a block diagram of example components of a UE 100. The block diagram shown in FIG. 3 is operating during reception of downlink data from a network. In some implementations, the UE 100 may include application circuitry 102, baseband circuitry 104, Radio Frequency (RF) circuitry 106, front-end circuitry 108, and one or more antenna tuners 110 associated with one or more associated antennas 112, coupled together at least as shown. The downlink data is received from base station 150 through data streams 155 transmit through antennas 152. The base station may be a cell tower, a wireless router, or any other device for transmitting data wirelessly. The base station 150 may provide the UE 100 access to one or more networks through a wireless connection.

In the UE 100, the application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some implementations, the baseband circuitry 104 may include a second generation (2G) baseband processor, a third generation (3G) baseband processor, a fourth generation (4G) baseband processor, and/or other baseband processor(s) for other existing generations, generations in development, or to be developed in the future (e.g., fifth generation (5G), 6G, or the like). The baseband circuitry 104 may handle various radio control functions that enable communication with one or more radio networks via the RF circuitry 106. The radio control functions may include, but are not limited to, signal modulation/demodulation, encoding/decoding, radio frequency shifting, etc. For example, the baseband circuitry 104 may provide data to RF circuitry 106 that provides information on throughput data 120 for uplink or downlink transmission of the UE. The throughput data 120 may be used as an indicator of performance of one or more of the antennas 112 operating while tuned to a current state by antenna tuners 110. The throughput data 120 during reception may include or be based on one or more of realized throughput, received signal strength indicator (RSSI), RSSI or throughput of a weakest stream, band, or channel, power consumption of modem or submodem systems, data provided by sensor or sensors of the UE, or the like.

In some implementations, modulation/demodulation circuitry of the baseband circuitry 104 may include Fast-Fourier Transform (FFT), preceding, and/or constellation mapping/demapping functionality. In some implementations, encoding/decoding circuitry of the baseband circuitry 104 may include convolution, tail-biting convolution, turbo, Viterbi, and/or Low Density Parity Check (LDPC) encoder/decoder functionality. Implementations of modulation/demodulation and encoder/decoder functionality are not limited to these examples and may include other suitable functionality in other implementations.

In some implementations, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) of the baseband circuitry 104 may be configured to run elements of the protocol stack for signaling of the PHY, MAC, RLC, PDCP, NAS and/or RRC layers. In some implementations, the baseband circuitry may include one or more audio digital signal processor(s) (DSP). The audio DSP(s) may include elements for compression/decompression and echo cancellation and may include other suitable processing elements in other implementations. Components of the baseband circuitry may be suitably combined in a single chip, a single chipset, or disposed on a same circuit board in some implementations. In some implementations, some or all of the constituent components of the baseband circuitry 104 and the application circuitry 102 may be implemented together such as, for example, on a system on a chip (SoC).

In some implementations, the baseband circuitry 104 may provide for communication compatible with one or more radio technologies. For example, in some implementations, the baseband circuitry 104 may support communication with an evolved universal terrestrial radio access network (EUTRAN) and/or other wireless metropolitan area networks (WMAN), a wireless local area network (WLAN), a wireless personal area network (WPAN). Implementations in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various implementations, the RF circuitry 106 may include switches, filters, amplifiers, etc. to facilitate the communication with the wireless network. RF circuitry 106 may include a receive signal path which may include circuitry to down-convert RF signals received from the front end circuitry 108 and provide baseband signals to the baseband circuitry 104. RF circuitry 106 may also include a transmit signal path which may include circuitry to up-convert baseband signals provided by the baseband circuitry 104 and provide RF output signals to the front end circuitry 108 for transmission.

In some implementations, the RF circuitry 106 may include a receive signal path and a transmit signal path. The receive signal path of the RF circuitry 106 may include mixer circuitry, amplifier circuitry and filter circuitry. The transmit signal path of the RF circuitry 106 may include filter circuitry and mixer circuitry. RF circuitry 106 may also include synthesizer circuitry to synthesize a frequency for use by the mixer circuitry of the receive signal path and the transmit signal path. In some implementations, the mixer circuitry of the receive signal path may be configured to down-convert RF signals received from the front end circuitry 108 based on the synthesized frequency provided by synthesizer circuitry. The amplifier circuitry of the RF circuitry 106 may be configured to amplify the down-converted signals and the filter circuitry may be a low-pass filter (LPF) or band-pass filter (BPF) configured to remove unwanted signals from the down-converted signals to generate output baseband signals. Output baseband signals may be provided to the baseband circuitry 104 for further processing. In some implementations, the output baseband signals may be zero-frequency baseband signals, although this is not a requirement. In some implementations, mixer circuitry of the receive signal path may comprise passive mixers, although the scope of the implementations is not limited in this respect.

In some implementations, the mixer circuitry of the transmit signal path may be configured to up-convert input baseband signals based on the synthesized frequency provided by the synthesizer circuitry to generate RF output signals for the front end circuitry 108. The baseband signals may be provided by the baseband circuitry 104 and may be filtered by filter circuitry of the RF circuitry 106. The filter circuitry or the RF circuitry may include a low-pass filter (LPF), although the scope of the implementations is not limited in this respect.

In some implementations, the mixer circuitry of the receive signal path and the mixer circuitry of the transmit signal path may include two or more mixers and may be arranged for quadrature downconversion and/or upconversion respectively. In some implementations, the mixer circuitry of the receive signal path and the mixer circuitry of the transmit signal path may include two or more mixers and may be arranged for image rejection (e.g., Hartley image rejection). In some implementations, the mixer circuitry of the receive signal path and the mixer circuitry of the transmit signal path may be arranged for direct downconversion and/or direct upconversion, respectively. In some implementations, the mixer circuitry of the receive signal path and the mixer circuitry of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode implementations, a separate radio IC circuitry may be provided for processing signals for each spectrum, although the scope of the implementations is not limited in this respect.

In some implementations, the synthesizer circuitry of RF circuitry 106 may be a fractional-N synthesizer or a fractional N/N+1 synthesizer, although the scope of the implementations is not limited in this respect as other types of frequency synthesizers may be suitable. For example, synthesizer circuitry of RF circuitry 106 may be a delta-sigma synthesizer, a frequency multiplier, or a synthesizer comprising a phase-locked loop with a frequency divider. The synthesizer circuitry may be configured to synthesize an output frequency for use by the mixer circuitry of the RF circuitry 106 based on a frequency input and a divider control input.

In some implementations, frequency input may be provided by a voltage controlled oscillator (VCO), although that is not a requirement. Divider control input may be provided by either the baseband circuitry 104 or the applications processor 102 depending on the desired output frequency. In some implementations, a divider control input (e.g., N) may be determined from a look-up table based on a channel indicated by the applications processor 102.

Synthesizer circuitry of the RF circuitry 106 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some implementations, synthesizer circuitry of the RF circuitry 106 may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency ($f_{LO}$). In some implementations, the RF circuitry 106 may include an IQ/polar converter.

As shown in FIG. 1, the UE may include separate RF circuitry 106A and 106B corresponding to respective antennas 112A and 112B. In some implementations, the RF circuitry 106 for the UE may be a single circuit including separate transmit paths and receive paths for each antenna coupled to the UE. The RF circuitry 106 may then use some components for use with multiple antennas. In some implementations, the UE may include separate RF circuitry 106A and 106B for respective antennas to increase processing speeds and reduce noise or interference from different signals.

The RF circuitry 106 may include control circuitry to control antenna tuners 110. For example, the RF circuitry 106 may generate a control signal 125 for a corresponding antenna tuner 110 based on throughput data 120 received from baseband circuitry 104. The RF circuitry 106 may generate the control signal 125 such that the antenna tuner 110 causes the antenna 112 to improve throughput performance for the UE 100. For example, if the antenna 112A is in a state such that a frequency or band used by the UE for reception is weaker than other frequencies or bands used by the UE, the control signal 125 may cause the antenna 112A to change to a state that receives signals better at the weak frequency or band. Thus, the new state of antenna 112 after the control signal 125 is applied by antenna tuners 110 may provide improved throughput based on improvement of the previous weakness.

In some implementations, the throughput data 120 may be based on signals received from the base station 150. For example, the baseband circuitry 104 may determine one or more indicators of throughput for each of one or more data streams. For instance, the baseband circuitry 104 may determine a measurement of realized throughput based on packets received from base station 150. Higher throughput may be indicative of a stronger signal or a signal with better signal to noise ratio than a weaker signal. Thus, weaker signals may have a lower realized throughput. In some implementations, the throughput data 120 may be based on a RSSI measured by the UE 100, power consumption of a modem of modem sub-system of the UE 100, or data provided by sensor or sensors of the UE 100. The throughput data 120 may also be based on individual data streams. For instance, in a MIMO system, the baseband circuitry 104 may provide throughput data 120 for each data stream 155 that is received from a base station 150. Accordingly, the antennas 112 may be tuned to improve performance for particular data streams. Similarly, when using carrier aggregation, the baseband circuitry 104 may provide throughput data for particular carriers within a band for intra-band operation or particular carriers in different bands for inter-band operation.

Front end circuitry 108 may include a receive signal path which may include circuitry configured to operate on RF signals received from one or more antennas 112, amplify the received signals and provide the amplified versions of the received signals to the RF circuitry 106 for further processing. Front end circuitry 108 may also include a transmit signal path which may include circuitry configured to amplify signals for transmission provided by the RF circuitry 106 for transmission by one or more of the one or more antennas 112.

In some implementations, the front end circuitry 108 may include a TX/RX switch to switch between transmit mode and receive mode operation. The front end circuitry 108 may include a receive signal path and a transmit signal path. The receive signal path of the front end circuitry 108 may include a low-noise amplifier (LNA) to amplify received RF signals and provide the amplified received RF signals as an output (e.g., to the RF circuitry 106). The transmit signal path of the front end circuitry 108 may include a power amplifier (PA) to amplify input RF signals (e.g., provided by RF circuitry 106), and one or more filters to generate RF signals for subsequent transmission (e.g., by one or more of the one or more antennas 112).

The antenna tuners 110 may cause the antennas 112 to change between various states. For example, a tunable antenna 112 may have various states that receive and transmit better at particular frequencies. Some tunable antennas may have a few states, while other tunable antennas may have tens, dozens, or hundreds of states. Rather than having predefined states, some tunable antennas 112 may be tuned to any frequency in a spectrum of frequencies. As shown in FIG. 1, each antenna 112 may have a corresponding antenna tuner 110. The block diagram in FIG. 1 shows the control signal 125 for antenna tuners 110 being generated by the RF circuitry 106, however, in some implementations, the control signal 125 may be generated by the baseband circuitry 104 or another component of the UE 100. For example, the baseband circuitry 104 may analyze throughput data and determine a new state for antennas 112 that may improve throughput for the UE. Rather than provide throughput data 120 to RF circuitry 106, the baseband circuitry 104 may generate and provide the control signal 125 to the antenna tuners 110 directly.

In some implementations, the UE 100 may include additional elements such as, for example, memory/storage, display, camera, sensor, and/or input/output (I/O) interface.

Figure 2:
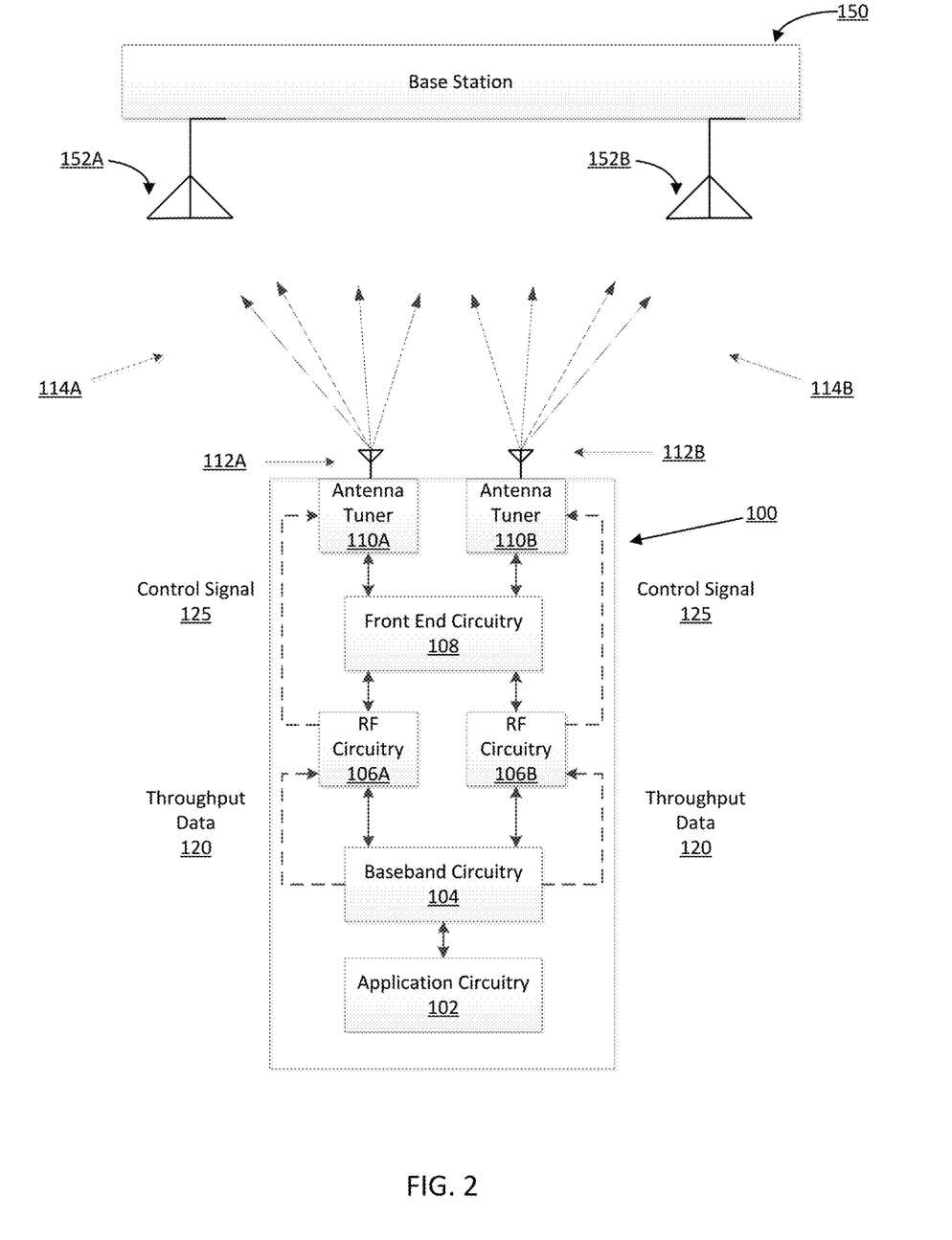
FIG. 2 is a block diagram illustrating components of an electronic device implementing aspects of the disclosure, according to an implementation.

FIG. 2 illustrates, for an implementation, a block diagram of example components of a UE 100 during uplink data transmission by the UE. In some implementations, the UE 100 may include application circuitry 102, baseband circuitry 104, radio frequency (RF) circuitry 106, front-end circuitry 108, and one or more antenna tuners 110 associated with one or more antennas 112, coupled together at least as shown. For example, the UE in FIG. 2 may be the same or similar to the device shown in FIG. 1, but shown during transmission of data instead of reception. Accordingly, detailed description of the similar components is not included herein.

During transmission, the throughput data 120 may include or be based on one or more of transmit power request by a base station, realized throughput, transmit power request for the weakest stream, band, or channel, power consumption by the UE, data provided by sensor or sensors of the UE, data obtained based on device settings, or the like.

In some implementations, the throughput data 120 may be based on signals received from the base station 150. For example, the baseband circuitry 104 may determine one or more indicators of throughput for each of one or more data streams. For instance, the baseband circuitry 104 may determine a measurement of realized throughput based on packets transmit to the base station 150. Higher throughput may be indicative of a stronger signal or a signal with better signal to noise ratio than a weaker signal. Thus, weaker signals may have a lower realized throughput. In some implementations, the throughput data 120 may be based on a transmit power request by the base stations 150. For example, the base station 150 may provide one or more transmit power control (TPC) command to the UE 100 to configure the power at which the UE 100 transmits data. Based on the configured power for each stream or carrier, the UE 100 may determine that one stream is weaker than the others. Thus, the UE 100 may generate a control signal 125 to tune the antenna 112 to improve performance for the weak carrier. Accordingly, the antennas 112 may be tuned to improve performance for particular data streams.

FIG. 3 is an example graph showing the relationship between frequency and reflection coefficient for a tunable antenna when it is tuned to four example states. The graph in FIG. 3 illustrates reflection coefficient curves A, B, C, and D of four states of a tunable antenna. For example, the states may correspond to possible tuning of one or both of antennas 112A and 112B in FIGS. 1 and 2. Lower reflection coefficient indicates more efficient reception of signals at a given frequency. Therefore, a UE may tune an antenna to a state with a low reflection coefficient at one or more frequencies that are scheduled by the network. For example, if a network schedules a UE to use frequency F1 as shown in FIG. 3, the UE may tune an antenna to state D such that the frequency of a point 310D corresponding to a lowest reflection coefficient at frequency F1 is used by the antenna. This may improve throughput by the UE or reduce the power required by the UE to receive or transmit at a given throughput.

As shown in FIG. 3, each state of an antenna may have better transmission characteristics at some frequencies than at others. Based on scheduled frequencies for transmission, an antenna may be set to one of the states by default. However, the state of the antenna may be changed based on actual throughput performance. For instance, an antenna may be set to a default state shown by curve D in FIG. 3 for a particular frequency or set of frequencies set by the network. However, the frequencies scheduled by the network may include one or more frequencies that are transmit more efficiently by the antenna in state A. Based on environmental factors, the one or more frequencies may be attenuated or experience more interference than others. Thus, in some cases, while state D may provide the most efficient transmission generally, in some environments, the frequencies that operate more efficiently in state A may experience greater interference than those that operate more efficiently in state A. A UE may use throughput data to determine that the overall efficiency of transmission across multiple frequencies may be greater if the antenna is tuned to state A.

In some implementations, the UE may operate using inter-band carrier aggregation. For example, the frequencies corresponding to local minimums 310A-310D in FIG. 3 may correspond to a first frequency band, while the frequencies corresponding to local minimums 320A-320D may correspond to a second frequency band. In such cases, the state of one or more antennas may need to balance the efficiencies of the frequencies in each band. Thus, if a primary carrier frequency operates more efficiently at state A in the first band, the antenna may default to such state. However, if based on performance, the UE determines that a second frequency used in the second band has low throughput, the UE may change the state to improve performance of the second frequency. For instance, the frequency F2 in the second band may perform well while operating in state D, but not perform well in state A. The UE may response by changing the state of the antenna to increase the efficiency of the second frequency F2 in the second band.

Based on performance of particular streams, frequencies, or bands, a UE may dynamically update the antenna tuning state to improve performance of a weakest performing stream. Methods of determining how to update an antenna are discussed further below. Although reflection coefficient curves for four states are shown in FIG. 3, in some implementations, there may be fewer or additional states. In addition, reflection coefficients are shown for a single antenna in FIG. 3, however, as discussed herein, a UE may have multiple independently tunable antennas with different reflection coefficient curves. The UE may tune each antenna to improve overall throughput of uplink and downlink data.

Figure 4:
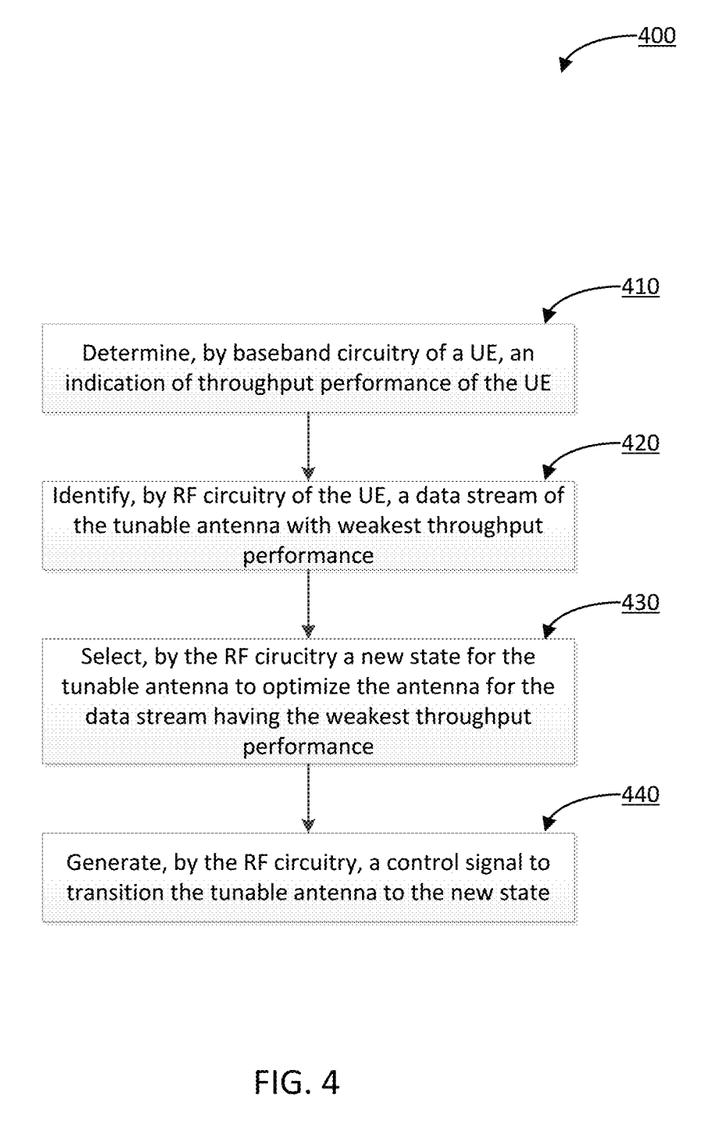
FIG. 4 illustrates a flowchart of an example method performed by user equipment to enhance performance of an antenna, according to an implementation.

FIG. 4 is a flowchart illustrating an example method 400 of tuning an antenna to optimize throughput of data. The method 400 may be performed by a UE as described with reference to FIGS. 1 and 2. For instance, the method 400 may be performed by a UE to optimize for throughput of uplink or downlink data. The method 400 may be performed continuously as new data indicative of throughput performance is measured or received by the UE. In some implementations, the method 400 may be performed at predetermined intervals or in response to a determination that realized throughput is below a threshold value.

Beginning in block 410, baseband circuitry of a UE determines an indication of throughput performance of the UE. For example, during uplink transmissions, the UE may receive a transmit power request by a base station for one or more of various data streams. In a MIMO system, the UE may receive a transmit power request for individual antennas that are providing multiple transmission paths. In a carrier aggregation scenario, the UE may receive a transmit power request for one or more carriers or one or more bands. In some implementations, the UE may also determine an indication of throughput performance within the UE. For example, the UE may measure power consumption during transmission, realized throughput, device settings, or other criteria that provide an indication of the quality of data streams. For example, if power consumption for a component of a modem is high, it may indicate that a transmission for a stream associated with the component is at a high power. Accordingly, the power consumption may indicate that the throughput performance of the stream is low.

Indications of throughput performance may be similar during downlink reception of data streams. For example, the UE may determine an indication of throughput performance based on realized throughput or power consumption of a modem or other system. In addition, the UE may determine a received signal strength indicator (RSSI) for each of the streams received by the antennas. A throughput performance indicator may include a throughput performance indication for each stream of multiple data streams or each carrier if there are multiple carriers.

As discussed with reference to FIGS. 1 and 2 above, the indication of throughput performance may be determined at baseband circuitry of a UE. The indication may then be provided to RF circuitry that controls the tuning of the antennas. In some implementations, other components of the UE may determine one or more indications of throughput performance in addition to or instead of baseband circuitry. For example, in some implementations, the RF circuitry may determine an indication of throughput performance without receiving throughput data from baseband circuitry.

In block 420, RF circuitry of the UE determines a data stream of the tunable antenna with weakest throughput performance based on the indication of throughput performance of the UE. For example, during downlink reception of data, the UE may determine that the data stream with the lowest RSSI has the weakest throughput performance. As another example, during uplink or downlink transmissions, the UE may determine that the weakest data stream is the stream with the lowest realized throughput. In some implementations, a combination of parameters may be used to determine the data stream with the weakest throughput performance. For example, the transmit power requested by a base station may be used in combination with realized throughput to determine a weakest data stream. The requested transmit power may indicate the strength of the signal received by the base station, but additional information of realized throughput may indicate if there is substantial noise or other interference that is limiting the performance of one or more data streams. In various implementations, any combination of transmission or reception parameters may be used to determine a weakest data stream. In some implementations, other components of the UE may determine the data stream with the weakest throughput performance.

In block 430, the RF circuitry of the UE selects a new state for the tunable antenna to optimize the antenna to improve performance for the data stream having the weakest throughput performance. The new state for the tunable antenna may be based on improving the reflection coefficient for the antenna at frequencies corresponding to the weakest data stream. The new state for an antenna may be based on a set of data stored at the UE that contains a relationship between each state of the antenna and frequencies that are optimized for that state. In some implementations, the RF circuitry of the UE may determine the new state for the antenna based on received throughput data or throughput data determined at the UE. For example, the RF circuitry may determine the weakest data stream and determine a frequency associated with that data stream. The RF circuitry may then access a stored set of antenna states with corresponding optimized frequencies and select a state that improves performance for the frequency associated with the weakest data stream. In some implementations, other components of the UE may select the new state for the tunable antenna.

In some implementations, each antenna of a plurality of tunable antennas coupled to the UE may be tuned to the same state to improve performance for a data stream. In some implementations, such as when the UE is operating in a MIMO environment, an antenna with the weakest data stream may be tuned to improve performance while another antenna may not be tuned. In some implementations, each antenna in a MIMO system may be tuned to improve performance of the weakest data stream for that particular antenna. In some implementations, such as during carrier aggregation, the method 400 may be performed individually for each antenna to improve the weakest stream of the individual antennas. In some implementations, multiple antennas may be tuned to improve the performance of a weakest stream such that the frequencies of the weakest stream are optimized across the antennas as a whole.

In block 440, the RF circuitry of the UE generates a control signal to transition the tunable antenna to the selected new state. In some implementations control signal may be generated for individual antennas in the case that there are multiple antennas. The control signal may also be generated for individual antennas by individual components of a UE as discussed above with reference to FIGS. 1 and 2. The control signal may then be applied to an antenna tuner such that the antenna tuner changes the transmission characteristics of the antenna to the new state. In some implementations, a component of the UE other than the RF circuitry may generate the control signal to transition the tunable antenna to the selected new state. After completion of the method 400, the UE may continuously repeat the method in order to optimize data transmission in a changing environment.

Figure 5A:
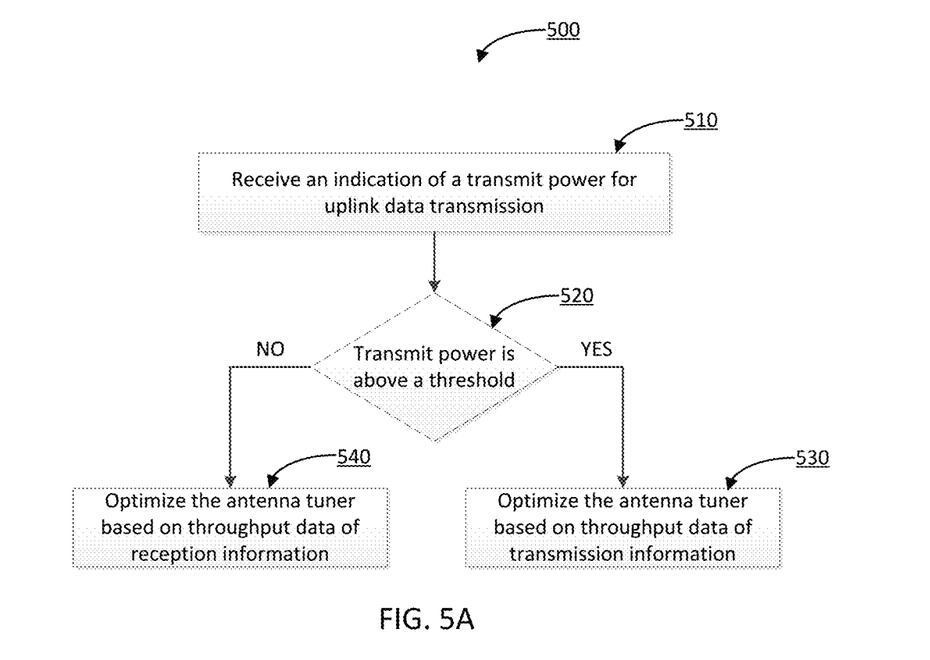
FIG. 5A illustrates a flowchart of an example method performed by a user equipment to determine whether to optimize performance for transmission or reception, according to an implementation.
Figure 5B:
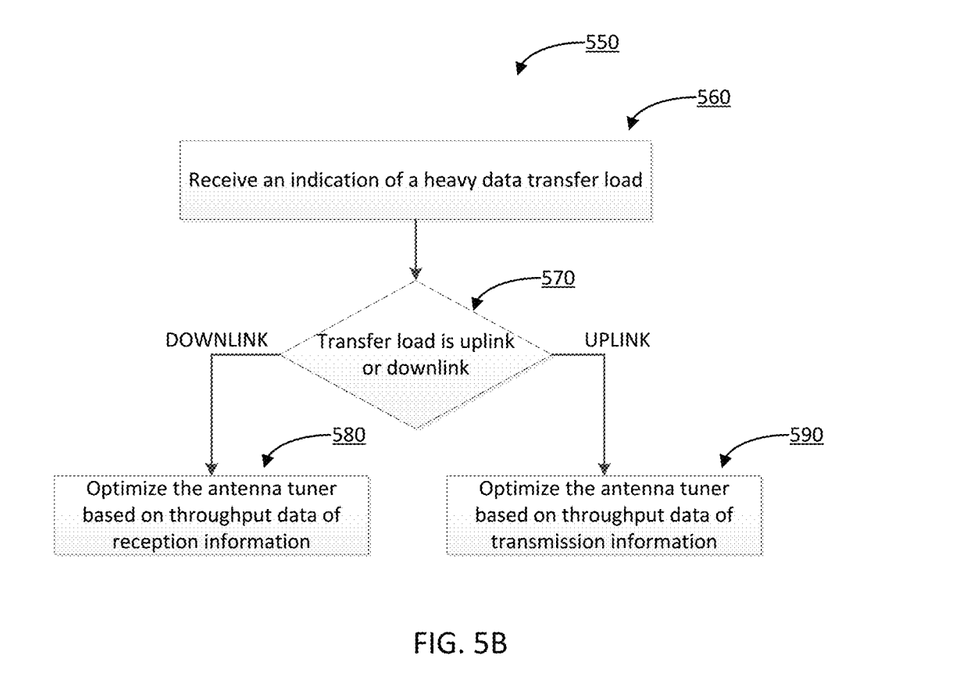
FIG. 5B illustrates a flowchart of an example method performed by a user equipment to determine whether to optimize performance for transmission or reception, according to an implementation

FIG. 4 describes a method 400 for dynamically tuning antennas to optimize throughput performance. However, in some environments, the throughput performance during uplink and downlink communications may have different characteristics. For example, scheduled communication times or frequencies may be different or the transmission paths may be affected differently by environmental factors. Accordingly, the UE may make a determination whether to optimize for uplink or downlink performance. FIGS. 5A and 5B depict two example methods for determining whether to optimize for uplink or downlink performance.

FIG. 5A is a flowchart showing a method 500 of determining whether to optimize performance of a tunable antenna for uplink or downlink transmissions, according to an implementation. Beginning in block 510, The UE receives an indication of transmission power for uplink data transmission. For example, the UE may receive a transmit power request from a base station for one or more data streams indicating a power transmission level. In some implementations, the UE may determine a transmission power based on power consumption of one or more components of the UE, such as a modem or component of a modem.

In block 520, the UE determines whether the transmit power is above a threshold value. The threshold value may be set to a level that indicates that the base station is not receiving the signal clearly. For example, the UE may set the threshold value at a transmit power based on the maximum power level for the transmitter. For example, a UE in an LTE system may have a maximum output power of approximately 23 dBm. The threshold transmit power may be set 10-15 dB below the maximum transmit power, for instance in the range of 8-13 dBm. In some implementations, other threshold values may be set. For example, the threshold may be set at a different level relative to the maximum output power or based on a different maximum output power for a different device.

If the UE determines that the transmit power is at or above a threshold, the method may continue to block 530 and optimize the antenna tuner based on the throughput of transmission data, uplink data, or transmission signals. For example, the UE may perform operations as described above with reference to the UE shown in FIG. 1 and operations of method 400 above. In some implementations, the UE may optimize the antenna tuner based on throughput of reception data in response to determining the transmit power is at the threshold instead of optimizing based on the throughput of transmission data.

If the UE determines that the transmit power is not above the threshold, the method may continue to block 540 and optimize the antenna tuner based on the throughput of reception data, downlink data, or received signals. For example, the UE may perform operations as described above with reference to the UE shown in FIG. 1 and operations of method 400 above.

FIG. 5B is a flowchart showing a method 550 of determining whether to optimize performance of a tunable antenna for uplink or downlink transmissions, according to an implementation. Beginning in block 560, The UE receives an indication of a heavy data transfer load. For example, in some embodiments, a heavy data transfer load may be a package larger than 100 MB. In some embodiments, the size of a package considered a heavy transfer load may be different. In addition, the size of a heavy transfer load may be different for uplink and downlink transmissions. The indication may be either for a download to the UE or for an upload to the network. For example, the indication may be based on queued data at the UE or based on an information element in an uplink data grant request to the network.

In block 570, the UE determines whether the transfer load is an uplink or downlink transfer. If the UE determines that the transfer is for a downlink load, the method may continue to block 580, where the UE optimizes the antenna tuner based on the throughput of reception data. If the UE determines that the transfer is for an uplink load, the method may continue to block 590, where the UE optimizes the antenna tuner based on the throughput of transmission data.

In some implementations, the UE may continue to optimize tunable antennas for uplink or downlink data transfers until the heavy data transfer is completed. In some implementations, the UE may continue to assess the data transfer load for uplink and downlink traffic and update whether the UE optimizes the tunable antennas for uplink or downlink traffic. In some implementations, the methods 5A and 5B may be used in conjunction to optimize the antenna tuners. For example, the UE may determine whether to tune for optimized uplink or downlink traffic based on transmit power according to method 500 in FIG. 5A until the UE recognizes an indication of a heavy data transfer load, at which point, the determination if made based on the method 550 in FIG. 5B.

While the present disclosure describes a number of implementations, those skilled in the art will appreciate numerous modifications and variations therefrom. It is intended that the appended claims cover all such modifications and variations as fall within the true spirit and scope of this present disclosure.

The following examples pertain to further implementations of the disclosure.

Example 1 is an apparatus of a user equipment (UE) to performing tuning of a tunable antenna, the apparatus comprising: baseband circuitry to determine an indication of throughput performance of a tunable antenna for the UE, wherein the tunable antenna is in a first state; and radio frequency (RF) circuitry coupled to the baseband circuitry, the RF circuitry to: select a new state for the tunable antenna based on the indication of throughput performance for the tunable antenna, wherein the new state is selected to improve throughput performance of a data stream for the UE; and generate a control signal to transition the tunable antenna to the new state.

In example 2, in the apparatus of example 1, the throughput performance of the tunable antenna comprises a first throughput performance indicator of a first carrier and a second throughput performance indicator of a second carrier, and wherein to select the new state, the processing device is to select a state with better performance at a first frequency associated with the first carrier or at a second frequency associated with the second carrier.

In example 3, in the apparatus of example 1, the throughput performance of the tunable antenna comprises a first throughput performance indicator of a first stream received from a first base station antenna and a second performance indicator of a second stream received from a second base station antenna, and wherein to select the new state, the processing device is to select a state with better performance at a first data path associated with the first stream or at a second data path associated with the second stream.

In example 4, in the apparatus of example 1, the RF circuitry is further to: determine that a transmit power of the UE is above a threshold; and optimize the tunable antenna based on transmission throughput in response to determining that the transmit power is above the threshold.

In example 5, in the apparatus of example 1, the baseband circuitry is further to: determine that the UE is to perform a data transfer larger than a threshold; and provide an indication to the RF circuitry to optimize the antenna tuner for uplink or downlink corresponding to the direction of the data transfer In example 6, the apparatus of example 1 further comprises: front end circuitry coupled to the tunable antenna and a second tunable antenna, wherein the tunable antenna and the second tunable antenna are to receive signals from a plurality of base station antennas.

In example 7, in the apparatus of example 1, the processing device is further to apply the control signal to an antenna tuner, wherein the antenna tuner is to set the antenna to the new state in response to processing the control signal.

Example 8 is an apparatus of a user equipment (UE) to performing tuning of a tunable antenna, the apparatus comprising: an antenna tuner coupled to the tunable antenna, the antenna tuner to tune the tunable antenna based on a control signal; and radio frequency (RF) circuitry coupled to the antenna tuner, the RF circuitry to: determine a transmission power of the UE; and generate the control signal, wherein the RF circuitry is to generate the control signal to: tune the antenna to optimize transmission data in response to determining that the transmission power is above a threshold value; or tune the antenna to optimize reception data in response to determining that the transmission power is below the threshold value.

In example 9, in the apparatus of example 8, to determine the transmission power of the UE, the RF circuitry is to process a transmit power request received from a base station or receive an indication of power consumption of a component of a modem of the UE.

In example 10, the apparatus of example 8, further comprises: baseband circuitry coupled to the RF circuitry, the baseband circuitry to determine an indication of throughput performance of the tunable antenna, wherein the tunable antenna is in a first state; and wherein the RF circuitry is further to generate the control signal based at least in part on the indication of throughput performance of the tunable antenna.

In example 11, in the apparatus of example 8, the indication of throughput performance comprises realized throughput, a received signal strength indicator, or power consumption in response, or a transmit power request.

In example 12, in the apparatus of example 8, the throughput performance of the tunable antenna comprises a first throughput performance indicator of a first carrier and a second throughput performance indicator of a second carrier, and wherein to select the new state, the processing device is to select a state with better performance at a first frequency associated with the first carrier or at a second frequency associated with the second carrier.

In example 13, in the apparatus of example 8, the first carrier and the second carrier are associated with frequencies in a single band of carrier frequencies.

In example 14, in the apparatus of example 8, the first carrier is in a first frequency band and the second carrier is in a second frequency band.

In example 15, in the apparatus of example 8, the RF circuitry is further to generate the control signal to tune the antenna to optimize transmission data in response to determining that the transmission power is at a threshold value.

Example 16 is a user equipment (UE) adapted to perform tuning of a plurality of tunable antennas, the UE comprising: baseband circuitry to: determine a first indication of throughput performance of a first tunable antenna of a user equipment (UE), wherein the tunable antenna is in a first state; and determine a second indication of throughput performance of a second tunable antenna of the UE, wherein the tunable antenna is in a second state; and radio frequency (RF) circuitry to: select a new first state for the first tunable antenna based on the first indication of throughput performance; and select a new second state of the second tunable antenna based on the second indication of throughput performance.

In example 17, in the UE of example 16, to select a new first state for the first tunable antenna, the RF circuitry is further to: identify a weakest carrier of a plurality of carriers of the first tunable antenna; determine a frequency associated with the weakest carrier of the plurality of carriers; and select the new first state based on the frequency associated with the weakest carrier of the plurality of carriers, wherein the new first state has a lower reflection coefficient at the frequency associated with the weakest carrier than the first state.

In example 18, in the UE of example 16, the first indication of throughput performance comprises an uplink throughput performance indicator and a downlink throughput performance indicator, and wherein the RF circuitry is further to: determine that a transmit power of the UE is above a threshold; and optimize the antenna tuner based on the uplink throughput performance indicator in response to determining that the transmit power is above the threshold.

In example 19, in the UE of example 16, the first indication of throughput performance comprises an uplink throughput performance indicator and a downlink throughput performance indicator, and the RF circuitry is further to: identify an uplink transfer load larger than a transfer threshold: and optimize the first antenna tuner based on the uplink throughput performance in response to identifying the uplink transfer load.

In example 20, in the UE of example 16, the first indication of throughput performance comprises realized throughput, a received signal strength indicator, power consumption, or a transmit power request.

In example 21, in the UE of example 16, the new first state optimizes the first antenna for a first carrier in a first frequency band and the new second state optimizes the second antenna for a second carrier in a second frequency band.

Example 22 is a method comprising: determining, by baseband circuitry of a user equipment (UE), an indication of throughput performance of a tunable antenna for the UE, wherein the tunable antenna is in a first state; selecting, by radio frequency (RF) circuitry coupled to the baseband circuitry, a second state for the tunable antenna based on the indication of throughput performance for the tunable antenna to improve throughput performance of a data stream for the UE; and generating a control signal to transition the tunable antenna to the second state.

In example 23, in the method of example 22, the throughput performance of the tunable antenna comprises a first throughput performance indicator of a first carrier and a second throughput performance indicator of a second carrier, and selecting the second state further comprises selecting a state with better performance at a first frequency associated with the first carrier or at a second frequency associated with the second carrier.

In example 24, in the method of example 22, the throughput performance of the tunable antenna comprises a first throughput performance indicator of a first stream received from a first base station antenna and a second performance indicator of a second stream received from a second base station antenna, and selecting the second state further comprises selecting a state with better performance at a first data path associated with the first stream or at a second data path associated with the second stream.

In example 25, the method of example 22 further comprises: determining that a transmit power of the UE is above a threshold; and optimizing the tunable antenna based on transmission throughput in response to determining that the transmit power is above the threshold.

In example 26, the method of example 22 further comprises: determining that the UE is to perform a data transfer larger than a threshold; and providing an indication to the RF circuitry to optimize the antenna tuner for uplink or downlink corresponding to the direction of the data transfer.

In example 27, the method of example 22 further comprises: receiving a plurality of signals, by the tunable antenna, from a plurality of base station antennas.

In example 28, the method of example 22 further comprises applying the control signal to an antenna tuner, wherein the antenna tuner is to set the antenna to the second state in response to processing the control signal.

Example 29 is an apparatus comprising: means for determining an indication of throughput performance of a tunable antenna for a user equipment (UE), wherein the tunable antenna is in a first state; means for selecting a second state for the tunable antenna based on the indication of throughput performance for the tunable antenna to improve throughput performance of a data stream for the UE; and means for generating a control signal to transition the tunable antenna to the second state.

In example 30, the apparatus of example 29 further comprises means for determining that a transmit power of the UE is above a threshold; and means for optimizing the tunable antenna based on transmission throughput in response to determining that the transmit power is above the threshold.

In example 31, the apparatus of example 29 further comprises means for determining that the UE is optimize the antenna tuner for uplink transmission in response to determining that the UE is to perform an uplink data transfer larger than a threshold.

In example 32, the apparatus of example 29 further comprises means for determining that the UE is optimize the antenna tuner for downlink transmission in response to determining that the UE is to perform a downlink data transfer larger than a threshold.

In example 33, the apparatus of example 29 further comprises means for receiving a plurality of signals from a plurality of base station antennas.

In example 34, the apparatus of example 29 further comprises means for applying the control signal to an antenna tuner, wherein the antenna tuner is to set the antenna to the second state in response to processing the control signal.

Example 35 is a method comprising: determining, by radio frequency (RF) circuitry coupled to an antenna tuner, a transmission power of a user equipment (UE); and generating a control signal for the antenna tuner, the control signal to: tune a tunable antenna coupled to the antenna tuner to optimize transmission data in response to determining that the transmission power is above a threshold value; or tune the tunable antenna to optimize reception data in response to determining that the transmission power is below the threshold value.

In example 36, in the method of example 35, determining the transmission power of the UE comprises processing a transmit power request received from a base station or receiving an indication of power consumption of a component of a modem of the UE.

In example 37, the method of example 35, further comprises determining, by baseband circuitry coupled to the RF circuitry, an indication of throughput performance of the tunable antenna, wherein the tunable antenna is in a first state, and wherein generating the control signal is based at least in part on the indication of throughput performance of the tunable antenna.

In example 38, in the method of example 37, the indication of throughput performance comprises realized throughput, a received signal strength indicator, or power consumption in response, or a transmit power request.

In example 39, the method of example 37, further comprises selecting a second state with better performance at a first frequency associated with a first carrier or at a second frequency associated with a second carrier, wherein the throughput performance of the tunable antenna comprises the first throughput performance indicator of the first carrier and the second throughput performance indicator of the second carrier.

In example 40, in the method of example 39, the first carrier and the second carrier are associated with frequencies in a single band of carrier frequencies.

In example 41, in the method of example 39, the first carrier is in a first frequency band and the second carrier is in a second frequency band.

In example 42, the method of example 35 further comprises generating the control to tune the antenna to optimize transmission data in response to determining that the transmission power is at a threshold value.

Example 43 is an apparatus comprising means to perform a method as claimed in any of examples 35 to 42.

Example 44 is machine-readable storage including machine-instructions that, when executed, cause an apparatus to perform a method as claimed in any of examples 35 to 42.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" on "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "optimizing," "associating," "obtaining," "identifying," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus of a user equipment (UE) to performing tuning of a tunable antenna, the apparatus comprising:
    baseband circuitry configured to determine an indication of throughput performance of the tunable antenna for the UE, wherein the tunable antenna is in a first state; and
    radio frequency (RF) circuitry coupled to the baseband circuitry, the RF circuitry configured to:
        select a second state for the tunable antenna based on the indication of throughput performance for the tunable antenna to improve throughput performance of a data stream for the UE; and
        generate a control signal to transition the tunable antenna to the second state.

2. The apparatus of claim 1,
wherein the throughput performance of the tunable antenna comprises a first throughput performance indicator of a first carrier and a second throughput performance indicator of a second carrier, and wherein to select the second state, the RF circuitry is further configured to select a state with better performance at a first frequency associated with the first carrier or at a second frequency associated with the second carrier.

3. The apparatus of claim 1,
wherein the throughput performance of the tunable antenna comprises a first throughput performance indicator of a first stream received from a first base station antenna and a second performance indicator of a second stream received from a second base station antenna, and wherein to select the second state, the RF circuitry is further configured to select a state with better performance at a first data path associated with the first stream or at a second data path associated with the second stream.

4. The apparatus of claim 1,
wherein the RF circuitry is further configured to:
    determine that a transmit power of the UE is above a threshold; and
    optimize the tunable antenna based on transmission throughput in response to determining that the transmit power is above the threshold.

5. The apparatus of claim 1,
wherein the baseband circuitry is further to:
    determine that the UE is to perform a data transfer larger than a threshold; and
    provide an indication to the RF circuitry to optimize the tunable antenna for uplink or downlink corresponding to the direction of the data transfer.

6. The apparatus of claim 1,
wherein the apparatus further comprises:
    front end circuitry coupled to the tunable antenna and a second tunable antenna, wherein the tunable antenna and the second tunable antenna are configured to receive signals from a plurality of base station antennas.

7. The apparatus of claim 1,
wherein the RF circuitry is further configured to apply the control signal to an antenna tuner, wherein the antenna tuner is to set the antenna to the second state in response to processing the control signal.

8. A user equipment (UE), comprising:
one or more tunable antennas;
baseband circuitry, wherein the baseband circuitry is configured to determine an indication of throughput performance of a first tunable antenna of the one or more tunable antennas, wherein the first tunable antenna is in a first state; and
radio frequency (RF) circuitry coupled to the baseband circuitry, wherein the RF circuitry is configured to:
    select a second state for the first tunable antenna based on the indication of throughput performance for the first tunable antenna to improve throughput performance of a data stream; and
    generate a control signal to transition the first tunable antenna to the second state.

9. The UE of claim 8,
wherein the throughput performance of the first tunable antenna comprises a first throughput performance indicator of a first carrier and a second throughput performance indicator of a second carrier, and wherein to select the second state, the RF circuitry is further configured to select a state with better performance at a first frequency associated with the first carrier or at a second frequency associated with the second carrier.

10. The UE of claim 8,
wherein the throughput performance of the first tunable antenna comprises a first throughput performance indicator of a first stream received from a first base station antenna and a second performance indicator of a second stream received from a second base station antenna, and wherein to select the second state, the RF circuitry is further configured to select a state with better performance at a first data path associated with the first stream or at a second data path associated with the second stream.

11. The UE of claim 8,
wherein the RF circuitry is further configured to:

determine that a transmit power of the UE is above a threshold; and optimize the first tunable antenna based on transmission throughput in response to determining that the transmit power is above the threshold.

12. The UE of claim 8, wherein the baseband circuitry is further to:

determine that the UE is to perform a data transfer larger than a threshold; and provide an indication to the RF circuitry to optimize the first tunable antenna for uplink or downlink corresponding to the direction of the data transfer.

13. The UE of claim 8, wherein the UE further comprises:

front end circuitry coupled to the first tunable antenna and a second tunable antenna of the one or more tunable antennas, wherein the first tunable antenna and the second tunable antenna are configured to receive signals from a plurality of base station antennas.

14. The UE of claim 8, wherein the RF circuitry is further configured to apply the control signal to an antenna tuner, wherein the antenna tuner is to set the first tunable antenna to the second state in response to processing the control signal.

15. A non-transitory computer readable memory medium storing program instructions executable by processing circuitry to cause a user equipment (UE) to:

determine an indication of throughput performance of a first tunable antenna of one or more tunable antennas, wherein the first tunable antenna is in a first state;

select a second state for the first tunable antenna based on the indication of throughput performance for the first tunable antenna to improve throughput performance of a data stream; and generate a control signal to transition the first tunable antenna to the second state.

16. The non-transitory computer readable memory medium of claim 15, wherein the throughput performance of the first tunable antenna comprises a first throughput performance indicator of a first carrier and a second throughput performance indicator of a second carrier, and wherein to select the second state, the program instructions are further executable to cause the UE to select a state with better performance at a first frequency associated with the first carrier or at a second frequency associated with the second carrier.

17. The non-transitory computer readable memory medium of claim 15, wherein the throughput performance of the first tunable antenna comprises a first throughput performance indicator of a first stream received from a first base station antenna and a second performance indicator of a second stream received from a second base station antenna, and wherein to select the second state, the program instructions are further executable to cause the UE to select a state with better performance at a first data path associated with the first stream or at a second data path associated with the second stream.

18. The non-transitory computer readable memory medium of claim 15, wherein program instructions are further executable to cause the UE to:

determine that a transmit power of the UE is above a threshold; and optimize the first tunable antenna based on transmission throughput in response to determining that the transmit power is above the threshold.

19. The non-transitory computer readable memory medium of claim 15, wherein the program instructions are further executable to cause the UE to:

determine that the UE is to perform a data transfer larger than a threshold; and provide an indication to optimize the first tunable antenna for uplink or downlink corresponding to the direction of the data transfer.

20. The non-transitory computer readable memory medium of claim 15, wherein the UE includes a second tunable antenna of the one or more tunable antennas, and wherein the first tunable antenna and the second tunable antenna are configured to receive signals from a plurality of base station antennas.

21. The non-transitory computer readable memory medium of claim 15, wherein the program instructions are further executable to cause the UE to apply the control signal to an antenna tuner, wherein the antenna tuner is to set the first tunable antenna to the second state in response to processing the control signal.

* * * * *